United States Patent
Saenger Nayver et al.

(10) Patent No.: US 10,234,720 B2
(45) Date of Patent: Mar. 19, 2019

(54) SECOND SURFACE TRANSFLECTOR FOR ELECTRO-OPTIC DEVICE

(71) Applicant: Gentex Corporation, Zeeland, MI (US)

(72) Inventors: Mario F. Saenger Nayver, Zeeland, MI (US); John S. Anderson, Holland, MI (US); George A. Neuman, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 24 days.

(21) Appl. No.: 15/650,540

(22) Filed: Jul. 14, 2017

(65) Prior Publication Data

US 2018/0017830 A1    Jan. 18, 2018

Related U.S. Application Data (60) Provisional application No. 62/363,038, filed on Jul. 15, 2016.

(51) Int. Cl.
*G02F 1/1335*    (2006.01)
*G02B 5/30*    (2006.01)
(Continued)

(52) U.S. Cl.
CPC ......... *G02F 1/133553* (2013.01); *B60Q 1/00* (2013.01); *G02B 5/30* (2013.01);
(Continued)

(58) Field of Classification Search
CPC .......... G02B 5/06; G02B 5/08; G02B 5/0816; G02B 5/20; G02B 5/282; G02B 5/30; G02B 27/01; G02B 27/0101; G02B 27/14; G02B 27/142; G02B 27/143; G02B 27/147; G02B 1/10; G02B 1/11; G02B 1/14;
(Continued)

(56) References Cited

U.S. PATENT DOCUMENTS

| | | |
|---|---|---|
| 697,499 A | 4/1902 | Kromenaker |
| 6,654,070 B1 | 11/2003 | Rofe |

(Continued)

FOREIGN PATENT DOCUMENTS

| | | |
|---|---|---|
| EP | 2131227 A2 | 12/2009 |
| WO | 2016081858 A1 | 5/2016 |

*Primary Examiner* — Loha Ben
(74) *Attorney, Agent, or Firm* — Price Heneveld LLP; Bradley D. Johnson (57) ABSTRACT

An electro-optic assembly includes a first partially reflective, partially transmissive substrate defining a first surface and a second surface. A second partially reflective, partially transmissive substrate defines a third surface and a fourth surface. A space is defined between a first substrate and a second substrate. An electro-optic material is disposed between the second surface of the first substrate and the third surface of the second substrate. The electro-optic assembly is operable to change the transmittance state in either a discrete or continuous manner. A transflective coating is disposed on the second surface. The transflective coating includes a silver conductive layer and an overcoat layer including one of a transparent conductive oxide (TCO) and a noble metal. The overcoat layer is disposed between the silver conductive layer and the electro-optic material.

23 Claims, 5 Drawing Sheets

(51) Int. Cl.
*G02B 27/14* (2006.01)
*G02B 27/01* (2006.01)
*G02F 1/15* (2006.01)
*G09G 3/38* (2006.01)
*G02F 1/153* (2006.01)
*B60Q 1/00* (2006.01)
*B32B 17/10* (2006.01)
*G02B 1/11* (2015.01)
*G02B 1/14* (2015.01)

(52) U.S. Cl.
CPC ....... *G02B 27/0101* (2013.01); *G02B 27/143* (2013.01); *G02B 27/147* (2013.01); *G02F 1/153* (2013.01); *G09G 3/38* (2013.01); *B32B 17/10174* (2013.01); *G02B 1/11* (2013.01); *G02B 1/14* (2015.01); *G02B 27/14* (2013.01); *G02B 2027/0196* (2013.01); *G02F 1/133555* (2013.01); *G02F 2203/09* (2013.01)

(58) Field of Classification Search
CPC .... G02B 2027/1096; G09G 3/34; G09G 3/38; B60Q 1/00; G02F 1/03; G02F 1/07; G02F 1/133553; G02F 1/133555; G02F 1/15; G02F 1/153; G02F 2203/02; G02F 2203/09; B60R 1/02; B60R 1/04; B60R 1/08; B60R 1/088; B32B 17/10174; B32B 17/10477; B32B 17/10486; B32B 17/10513

USPC ....... 359/237, 240, 241, 245, 265, 267, 315, 359/318, 629, 630; 345/105, 106

See application file for complete search history.

(56) References Cited

U.S. PATENT DOCUMENTS

| | | | | |
|---|---|---|---|---|
| 7,619,508 | B2* | 11/2009 | Lynam | B60K 35/00 340/438 |
| 7,826,123 | B2* | 11/2010 | McCabe | B60R 1/088 359/265 |
| 8,277,059 | B2* | 10/2012 | McCabe | B60R 1/088 359/603 |
| 8,988,755 | B2* | 3/2015 | McCabe | B60R 1/08 359/245 |
| 9,290,127 | B2* | 3/2016 | McCabe | B60R 1/08 |
| 9,878,669 | B2* | 1/2018 | Kendall | B60R 1/04 |
| 2003/0192991 | A1 | 10/2003 | Rukavina et al. | |
| 2004/0160657 | A1 | 8/2004 | Tonar et al. | |
| 2004/0233552 | A1 | 11/2004 | Tonar et al. | |
| 2007/0206263 | A1 | 9/2007 | Neuman et al. | |
| 2008/0218434 | A1 | 9/2008 | Kelly et al. | |
| 2016/0147126 | A1 | 5/2016 | Cammenga et al. | |
| 2017/0166134 | A1* | 6/2017 | Gao | B60R 1/04 |
| 2018/0246265 | A1* | 8/2018 | Neuman | G02B 5/282 |

* cited by examiner

SECOND SURFACE TRANSFLECTOR FOR ELECTRO-OPTIC DEVICE

CROSS-REFERENCE TO RELATED APPLICATION

This application claims priority to and the benefit under 35 U.S.C. § 119(e) of U.S. Provisional Application No. 62/363,038, filed on Jul. 15, 2016, entitled "SECOND SURFACE TRANSFLECTOR FOR ELECTRO-OPTIC DEVICE," the disclosure of which is hereby incorporated herein by reference in its entirety.

FIELD OF THE DISCLOSURE

The present disclosure generally relates to an electro-optic device, and more particularly, to an electro-optic device having a second surface transflector.

SUMMARY OF THE DISCLOSURE

According to one aspect of the present disclosure, an electro-optic assembly includes a first partially reflective, partially transmissive substrate defining a first surface and a second surface. A second partially reflective, partially transmissive substrate defines a third surface and a fourth surface. A space is defined between a first substrate and a second substrate. An electro-optic material is disposed between the second surface of the first substrate and the third surface of the second substrate. The electro-optic assembly is operable to change the transmittance state in either a discrete or continuous manner. A transflective coating is disposed on the second surface. The transflective coating includes a silver conductive layer and an overcoat layer including one of a transparent conductive oxide (TCO) and a noble metal. The overcoat layer is disposed between the silver conductive layer and the electro-optic material.

According to another aspect of the present disclosure, an electro-optic assembly includes a first partially reflective, partially transmissive substrate defining a first surface and a second surface. A second partially reflective, partially transmissive substrate defines a third surface and a fourth surface. A space is defined between a first substrate and a second substrate. An electro-optic material is disposed between the second surface of the first substrate and the third surface of the second substrate. The electro-optic assembly is operable to change the transmittance state in either a discrete or continuous manner. A transflective coating is disposed on the second surface. The transflective coating includes a silver conductive layer and a base layer including at least one of a transparent conductive oxide (TCO), a dielectric material, and a noble metal. The base layer is disposed between the silver conductive layer and the first substrate.

According to yet another aspect of the present disclosure, an electro-optic assembly includes a first substrate defining a first surface and a second surface. A second substrate defines a third surface and a fourth surface. A space is defined between the first substrate and the second substrate. An electro-optic material is disposed between the second surface of the first substrate and the third surface of the second substrate. A transflective coating is disposed on at least one of the first and second surfaces. The transflective coating includes a dielectric layer adjacent to the first substrate and a conductive metallic layer. The transmittance of the transflective coating is between about 15% and 50% and the reflectance is between about 10% and 50%.

These and other features, advantages, and objects of the present disclosure will be further understood and appreciated by those skilled in the art by reference to the following specification, claims, and appended drawings.

DETAILED DESCRIPTION

The present illustrated embodiments reside primarily in combinations of method steps and apparatus components related to an electro-optic device. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
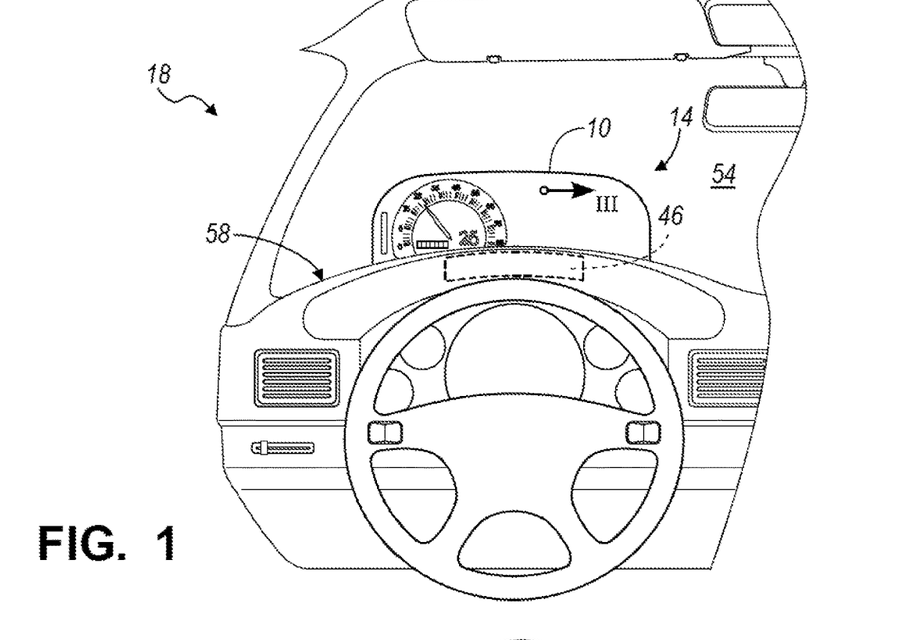
FIG. 1 is a front perspective view of a heads up display system incorporating an electro-optic-element, according to one example.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

In regards to FIGS. 1-7, reference numeral 10 generally designates an electro-optic assembly. The electro-optic assembly 10 may be utilized in a heads up display system 14 of a vehicle 18. The electro-optic assembly 10 may have a first partially reflective, partially transmissive glass substrate 22 and a second partially reflective, partially transmissive glass substrate 26. The first substrate 22 may have a first surface 22A and a second surface 22B. The second substrate 26 may have a third surface 26A and a fourth surface 26B. The first and second substrates 22, 26 may be positioned in a parallel spaced-apart relationship and may have a seal 30 disposed around a perimeter of the first and second substrates 22, 26. The first substrate 22 and the second substrate 26 define a cavity 34. An electro-optic material 38 is disposed in the cavity 34 between the first and second substrates 22, 26. In at least one example, the electro-optic assembly 10 is configured to have a non-varying reflectance and a varying transmittance. A "clear state" of the electro-optic assembly 10 refers to the condition of maximum transmittance. The activation of the electro-optic material 38 may reduce the transmittance of the electro-optic assembly 10 to a "darkened state." The "low end" transmittance refers to the minimum transmittance attainable by the electro-optic assembly 10.

By way of explanation and not limitation, the electro-optic assembly 10 may be included in the heads up display system 14 of the vehicle 18. In such an example, the electro-optic assembly 10 may function as a combiner screen to reflect a primary image projected by a projector 46. The electro-optic assembly 10 may be controlled to vary the amount of light transmission based on input from a control circuit. For example, in daylight conditions, the electro-optic assembly 10 may be darkened to improve or increase the contrast ratio and allow for improved visibility of information projected on the electro-optic assembly 10 from the projector 46. The contrast ratio may represent the ratio of a primary reflected image from the projector 46 and the light transmitted through the electro-optic assembly 10 (e.g., in either the clear state or the darkened state).

Figure 2:
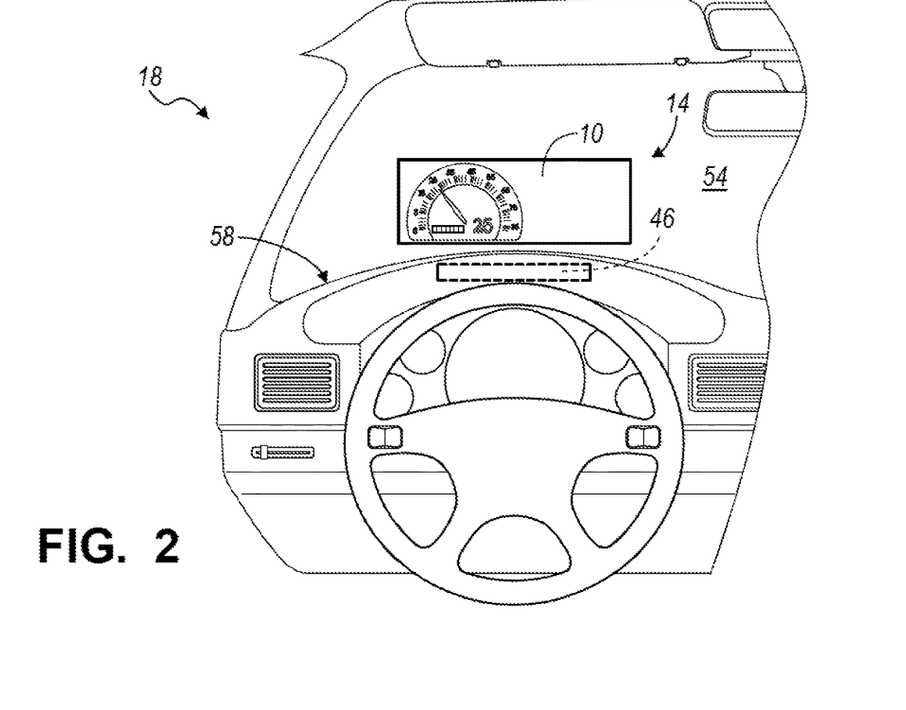
FIG. 2 is a front perspective view of a heads up display system incorporating an electro-optic-element, according to another example.

The heads up display system 14 is capable of use in a variety of applications, such as automotive and aerospace applications, to present information to a driver or pilot while allowing simultaneous forward vision. In some examples, the heads up display system 14 may be provided vehicle rearward of a windscreen 54 and protruding from an instrument panel 58 (FIG. 1), while in other examples, the electro-optic assembly 10 may be positioned directly on the windscreen 54 (FIG. 2). The electro-optic assembly 10 may be any size, shape, bend radius, angle, or position. The electro-optic assembly 10 may be used to display many vehicle related functions or driver assistance systems, such as alerts, warnings, or vehicle diagnostics. In the depicted examples, the speed of the vehicle 18 is being displayed on the electro-optic assembly 10.

With regard to the heads up display systems 14, the image projected onto the electro-optic assembly 10 should be bright enough to see in any condition. This is particularly challenging when the lighting outside the vehicle 18 is bright. The contrast between the light from the projector 46 and the lighting behind the electro-optic assembly 10 may be low on a bright sunny day. While a brighter, more intense lighting source (e.g., the projector 46) improves the contrast, increasing the display brightness may not be the most economical solution and a display that is bright enough to provide reasonable contrast in very bright daylight conditions will be too bright in other conditions. Although controls may be used to deal with variations in brightness, the specific background is ever changing in a moving vehicle, and depends, in part, on the position of the eyes of the driver. In accordance with one example, the electro-optic assembly 10 may be configured to lower the transmittance and/or to increase the contrast ratio.

Depending on the application, there may be a need for a higher or lower transmittance in the clear state, different reflectance values for optimal contrast ratios, and/or broader dynamic range of the transmittance levels. The initial reflectance and range of transmittance properties is further complicated by the capabilities of the projector 46 employed with the heads up display system 14 and the light output capabilities of the projector 46 along with the light transmittance levels for the windscreen 54. The windscreen 54 will have a direct impact on the contrast ratio and visibility of the image from the heads up display system 14. There are a number of factors which affect the transmittance levels of the windscreen 54. The minimum light transmittance is based on the rules in the location in which the vehicle 18 is sold but higher transmittance levels may be present based on how the vehicle 18 is equipped and marketed. This range of factors creates the need for solutions that may be adapted to different vehicle and environmental conditions.

Another aspect that should be considered when utilizing the heads up display system 14 is a secondary reflection from the first through fourth surfaces 22A-26B of the first and second substrates 22, 26. Reflection off of the first through fourth surfaces 22A-26B may create a double image effect from secondary reflections that do not perfectly align with the primary reflected image (e.g., due to geometries of the components of the electro-optic assembly 10). The double image that may be formed from secondary reflections off of the first through fourth surfaces 22A-26B may cause the primary image projected by the projector 46 and reflected by the electro-optic assembly 10 to appear blurry or unclear.

According to one example, the electro-optic assembly 10 may be assembled using two approximately 1.6 mm glass substrates (e.g., the first and second substrates 22, 26), which are both bent with a spherical radius of approximately 1250 mm, or other thicknesses for the first and second substrates 22, 26 may be used. In other examples, the first and second substrates 22, 26 may be bent to have a "free-form" shape. The desired shape is one in which the resultant primary reflected image "appears" to be forward of the electro-optic assembly 10 and forward of the vehicle 18. The exact surface contour needed to attain this characteristic is a function of the properties of the projector 46, the projector 46 and driver location, as well as the electro-optic assembly 10 location, relative to the other two locations. Having the image projected forward of the vehicle 18 allows the driver to obtain the desired information without having to change their eyes to adapt for different focal distances. In a traditional heads up display located within the vehicle 18, the eyes of the driver often have to re-focus to the shorter viewing distance, thus decreasing the time spent viewing the road. Furthermore, the eyes of the driver will also then have to re-focus on the road ahead, which further decreases the time spent viewing the road and forward conditions. The shape of the electro-optic assembly 10 should also be selected so as to preserve the basic characteristics of the projected image (i.e., straight lines remain straight, aspect ratios of images are preserved, etc.).

In the depicted example, each of the first and second substrates 22, 26 include a rounded edge 62 and a contact edge 66 that is not rounded. The non-rounded contact edge 66 may be desirable for ease of contact, and if the device is supported by that edge, there would be no need to round the first and second substrates 22, 26 along the contact edge 66. Any exposed edge on the electro-optic assembly 10 may be generally rounded. The radius of curvature of the rounded edges 62 may be greater than approximately 2.5 mm.

Figure 3:
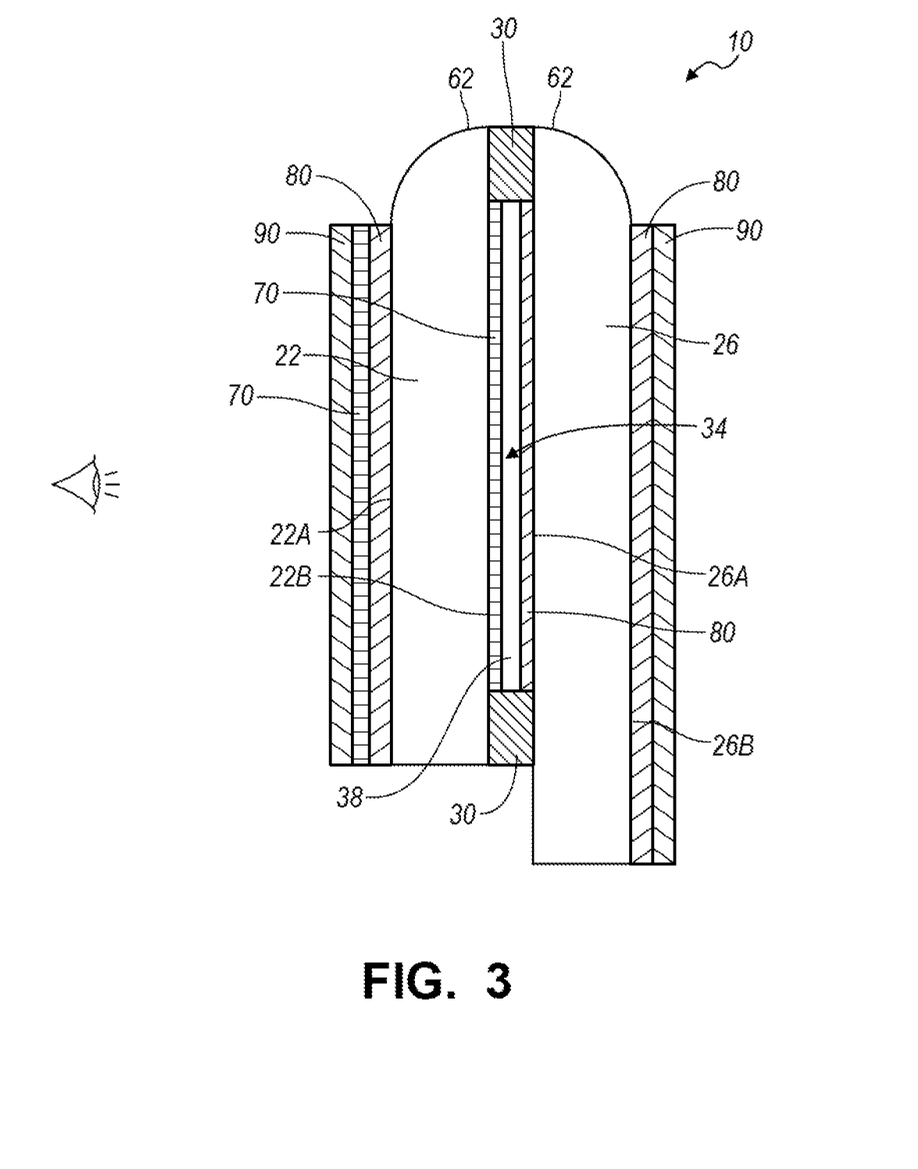
FIG. 3 is a cross-sectional view of the electro-optic assembly of FIG. 1 across line III.

Referring now to FIG. 3, the first substrate 22 includes the first surface 22A and the second surface 22B. The second surface 22B may be coated with indium tin oxide with a sheet resistance of approximately 12 ohms/sq. The first surface 22A may be concave and may be coated with chromium (Cr). The coated first substrate 22 may have a transmittance of approximately 37.8% and a reflectance of approximately 25.4%. The second substrate 26 defines the third and fourth surfaces 26A, 26B. The third surface 26A may be coated with indium tin oxide with a sheet resistance of approximately 12 ohms/sq.

From the first surface 22A, the electro-optic assembly 10 may have a clear state reflectance of approximately 25% and a transmittance of approximately 24%. The electro-optic assembly 10 may have a low end, or state, transmittance of approximately 10.5% while maintaining a reflectance from the first surface 22A of approximately 15%. Alternatively, in other examples, the high end, or state, transmittance of the electro-optic assembly 10 may be greater than 45% or even 60%. In one example, the transmittance of the transflective coating is between about 15% and 50% and the reflectance is between about 10% and 50%. In another example, the transflective coating of the electro-optic assembly may have a reflectance of between about 15% and 40% and a transmittance between about 20% and 40%. The characteristics of the electro-optic assembly 10 may also be altered so that the low end transmittance is less than 7.5% or even less than 5% in the darkened state. In some examples, transmittance levels down to 2.5% or less may be desirable. Increasing the high end transmittance may be obtained by the use of coatings and materials which have low absorption, as will be described herein. Lower low end transmittances may be obtained through the inclusion of materials which have higher absorption. If a wide dynamic range is desired, then low absorption materials may be used in combination with electro-optic materials and cell spacings (e.g., the space between the first and second substrates 22, 26) which attain higher absorbance in the activated state. Those skilled in the art will recognize that there exists a multitude of combinations of coatings and electro-optic materials, cell spacings, and coating conductivity levels that may be selected to attain particular device characteristics.

To provide electric current to the first and second substrates 22, 26 and electro-optic material 38, electrical elements may be provided on opposing sides of the first and second substrates 22, 26 (e.g., the second and third surfaces 22B, 26A) to generate an electrical potential therebetween. In one example, a J-clip may be electrically engaged with each electrical element, and electrical element wires extend from the J-clips to a primary printed circuit board. To provide the greatest surface area through the electro-optic assembly 10, the contacts are located along one side of the device. In this example, there is a back plate and top plate offset to allow contact, such as a bus clip. Other contact designs are possible, including the use of conductive ink or epoxy.

According to various examples, the electro-optic material 38 may be an electrochromic material or medium. In electrochromic examples, the electro-optic material 38 may include at least one solvent, at least one anodic material, and at least one cathodic material. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," U.S. Pat. No. 5,998,617 entitled "ELECTROCHROMIC COMPOUNDS," U.S. Pat. No. 6,020,987 entitled "ELECTROCHROMIC MEDIUM CAPABLE OF PRODUCING A PRE-SELECTED COLOR," U.S. Pat. No. 6,037,471 entitled "ELECTROCHROMIC COMPOUNDS," U.S. Pat. No. 6,141,137 entitled "ELECTROCHROMIC MEDIA FOR PRODUCING A PRE-SELECTED COLOR," U.S. Pat. No. 6,241,916 entitled "ELECTROCHROMIC SYSTEM," U.S. Pat. No. 6,193,912 entitled "NEAR INFRARED-ABSORBING ELECTROCHROMIC COMPOUNDS AND DEVICES COMPRISING SAME," U.S. Pat. No. 6,249,369 entitled "COUPLED ELECTROCHROMIC COMPOUNDS WITH PHOTOSTABLE DICATION OXIDATION STATES," and U.S. Pat. No. 6,137,620 entitled "ELECTROCHROMIC MEDIA WITH CONCENTRATION ENHANCED STABILITY, PROCESS FOR THE PREPARATION THEREOF AND USE IN ELECTROCHROMIC DEVICES," U.S. Patent Application Publication No. 2002/0015214 A1 entitled "ELECTROCHROMIC DEVICE," now U.S. Pat. No. 6,519,072, and International Patent Application Serial Nos. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," PCT/EP98/03862 entitled "ELECTROCHROMIC POLYMER SYSTEM," and PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," which are herein incorporated by reference in their entirety. The first and second substrates 22, 26 are not limited to glass elements but may also be any other element having partially reflective, partially transmissive properties.

With reference again to FIG. 3, the electro-optic assembly 10 may include a transflector as well as a variety of other features. More specifically, the electro-optic assembly 10 may include a transflective coating 70, an anti-reflection coating 80, and a scratch-resistant coating 90. In the depicted example, the transflective coating 70 is positioned proximate the first surface 22A, but may additionally or alternatively be positioned on the second surface 22B without departing from the teachings provided herein. In the depicted example, the anti-reflection coating 80 is on the first, third and fourth surfaces 22A, 26A, 26B, but it will be understood that the anti-reflection coating 80 may additionally or alternatively be positioned on the second surface 22B without departing from the teachings provided herein. In some examples, the anti-reflection coating 80 is positioned on at least one of the first and second surfaces 22A, 22B, and may be positioned on whichever of the first and second surfaces 22A, 22B is opposite the surface onto which the transflective coating 70 is positioned. The anti-reflection coatings 80 on the second and third surfaces 22B, 26A, in certain examples, function as electrodes (e.g., an anti-reflective electrode) to enable darkening of the electrochromic medium 38. It will be understood, that when the transflective coating 70 is located on the second surface 22B, in certain examples, it may also serve a dual purpose and also act as an electrode. In the depicted example, the scratch-resistant coating 90 is positioned proximate the first and fourth surfaces 22A, 26B. It will be understood that although described as separate layers, the transflective coating 70, the anti-reflection coating 80, and/or the scratch-resistant coating 90 may share properties that function as the other coatings, as described in greater detail herein.

Figure 6:
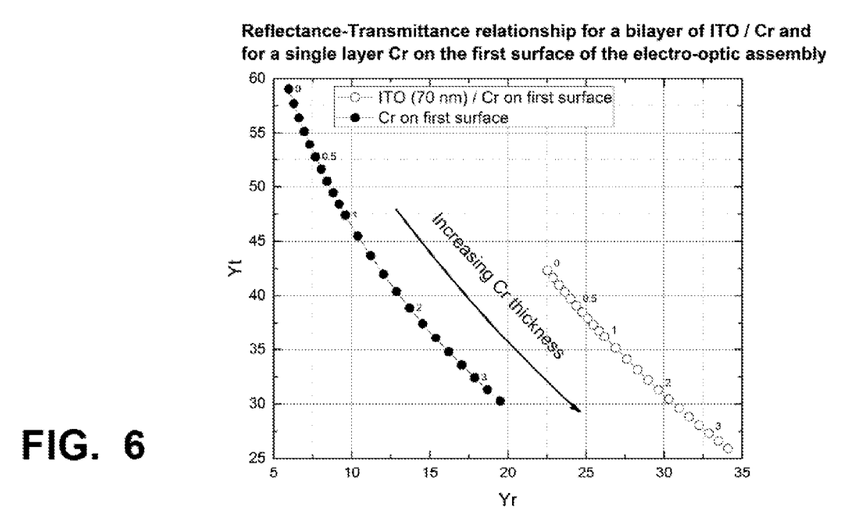
FIG. 6 illustrates the transmittance versus reflectance relationship for a single layer of Cr and a bilayer of ITO/Cr bilayer on the electro-optic assembly first surface.

In a first example, the transflective coating 70 may be a thin metal layer (e.g., a metal-based coating 70), such as Cr or another metal. A potential downside of using a single metal coating layer as the transflective coating 70 is that there is a defined relationship between the reflectance and transmittance which is derived from the thickness of the metal. A single-metal layer does not generally allow for reflectance and transmittance to be independently controlled. In another example of the transflective coating 70, a low absorption layer, including a material of lower absorption than the metal, such as indium tin oxide (ITO) or a dielectric material, is located in between the substrate (e.g., the first substrate 22) and the metal coating layer. In this embodiment, the transflective coating 70 may be located on either the first surface 22A or the second surface 22B. FIG. 6 compares the attainable transmittance and corresponding reflectance values for an electro-optic assembly 10 with a single Cr layer versus a bilayer of ITO (70 nanometers (nm) thick, next to glass) and Cr (e.g., the transflective coating 70) on the first surface 22A for different values of the Cr layer thickness. For both cases, the coatings on the second surface 22B and the third surface 26A are composed of 115 nm thick ITO, and the fourth surface 26B is coated with a thin chromium layer. The addition of a low absorption layer, such as ITO, increases the range of attainable reflectance and transmittance values for the transflective coating 70 by making it possible to tune the reflectance and reflected color independent of the thickness and the refractive index. In order to maximize the reflected intensity, the thickness of the low absorption layer is chosen to satisfy a condition of constructive interference as given by the following equation:

$$2dn = \left(m + \frac{1}{2}\right)\lambda,$$

where d is the layer thickness, m is the interference order, n is the layer refractive index and $\lambda$ is the light wavelength. It will be understood that this equation represents the conditions for maximizing the reflectance increase with the use of an additional low absorption layer. The thickness of the low absorption layer, which may include a dielectric material, may be between from about 5 to 240 nm, or between about 10 and 120 nm or between 20 and 100 nm.

With reference to FIG. 6, the thickness of the ITO (e.g., the low absorption layer) is about 70 nm, which corresponds to m=0 and $\lambda$~575 nm. The refractive index of the low absorption layer may be greater than about 1.3. In this case, the deposition conditions for the ITO were chosen to increase the refractive index of the ITO from a typical 1.8 to about 2.07 at 550 nm, and therefore increase the reflectance according to the Fresnel equation at normal angle of incidence:

$$R = \left|\frac{n_1 - n_2}{n_1 + n_2}\right|^2,$$

where $n_1$ and $n_2$ correspond to the refractive indices for the two media of an optical interface. The reflected color may also be tuned slightly by increasing or decreasing the thickness of the low absorption layer. The metal layer may be selected from the metal list provided below and the material of the low absorption layer may be selected from the list of dielectric materials provided below which meet the refractive index properties for this example.

Figure 7:
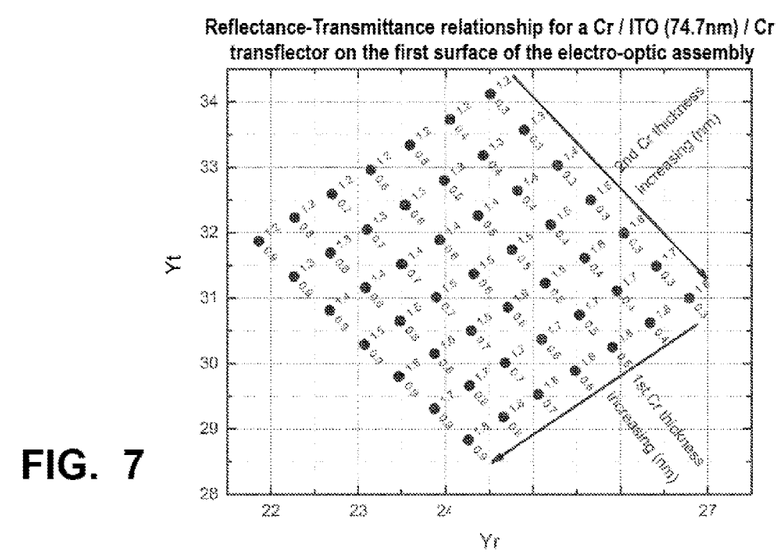
FIG. 7 illustrates the transmittance versus reflectance relationship for a Cr/ITO/Cr multilayer transflector on the electro-optic assembly first surface.

Even though the example of the transflective coating 70 having a dielectric-metal bilayer provides a higher range of attainable values for reflectance and transmittance than a single metallic layer, it still may be a challenge to tune the refractive index and absorption of the materials to achieve a particular reflectance and transmittance level. Therefore, it may be advantageous to have a transflective coating 70 that allows more flexibility in terms of reflectance and transmittance values, especially when lower transmittance values are sought. Accordingly, in another example of the transflective coating 70, such characteristics may be obtained with a multi-layer coating, such as a metal/dielectric/metal structure (MDM), which may be used as either a first surface or a second surface transflective coating. Generally, an M-layer of the MDM coating includes one or more of chromium, molybdenum, nickel, Inconel, indium, palladium, osmium, tungsten, rhenium, iridium, rhodium, ruthenium, stainless steel, tantalum, titanium, copper, gold, platinum, any other platinum group metals, zirconium, vanadium AlSi alloys, and alloys, and/or combinations thereof. It will be understood that any of the aforementioned metals may be utilized for the single or bilayer examples of the transflective coating 70. In some examples, combinations of metals and dielectric materials may depend on whether the transflective coating 70 is configured on the first surface 22A or the second surface 22B for durability or electrode properties. The dielectric material may be selected from one or more of the following: ITO, $SnO_2$, SiN, $MgF_2$, $SiO_2$, $TiO_2$, $F:SnO_2$, $NbO_x$, $TaO_x$, indium zinc oxide, aluminum zinc oxide, zinc oxide, electrically conductive $TiO_2$, $CeO_x$, ZnS, chromium oxide, $ZrO_x$, $WO_3$, nickel oxide, $IrO_2$, $NiO_x$, $CrO_x$, $NbO_x$, and $ZrO_x$, or other material with a refractive index between about 1.37 and about 4. It will be understood that any of the aforementioned dielectrics may be utilized for the bilayer example of the transflective coating 70. FIG. 7 depicts the reflectance and transmittance values for a multi-layer transflective structure (e.g., the transflective coating 70) with a Cr/ITO/Cr structure, where the ITO thickness is 74.7 nm. Each point denotes a particular reflectance/transmittance (R/T) value for a combination of $1^{st}$ and $2^{nd}$ Cr layer thicknesses. It is possible to see that these two parameters span a range of transmittance values for a particular reflectance and it is possible to control reflectance and transmittance separately in this range. The relationship between the metal layers will change as the thickness and index of the middle low absorption layer changes. Similarly, the reflectance and transmittance values will shift as different metals and dielectric layers are used. The reflectance of the MDM stack may be between about 10 to 50%, or may be between about 15 to 40%, or may be between about 20 and 35%. The transmittance may be between about 15 and 50%, or may be between about 20 and 40%, or may be between about 25 and 35%. The thickness of the metal layers may be between about 0.1 to 10 nm, or between about 0.2 and 5 nm, or between about 0.3 and 2.5 nm. The thickness of the dielectric layer may be between from about 5 to 240 nm, or between about 10 and 120 nm or between about 20 and 100 nm. As set forth herein, an undercoat metallic layer may be positioned between the first substrate and the dielectric layer.

With reference now to FIG. 7, the selection of metal will also shift the illustrated relationships. In certain embodiments, two different metals may be selected for the top and bottom M-layers and the D-layer may be further subdivided into sub-layers and include materials of different refractive indices. Additional D- and/or M-layers may be added without deviating from the teachings provided herein. The additional layers may be added to improve durability, adhesion, or alter the color and/or reflectance and transmittance ranges or robustness.

Alternate materials that provide different R/T values, as found in metals, may be used as the transflective coating 70. Other options include transparent conductive oxides (TCOs) and dielectric layers, along with materials, such as $TiO_2$ or diamond-like carbon (DLC) (FIG. 7).

In embodiments where it is desirous that the transflective coating is on the second surface 22B, the transflective coating 70 may function as the electrode for the electrochromic media. The transflective coating 70, in this embodiment, may have a sheet resistance less than about 20 ohms/sq, less than about 15 ohms/sq, less than about 10 ohms/sq, or less than about 5 ohms/sq. The transflector, to be compatible with the electrochromic media, may include an electrically conductive layer adjacent to the electrochromic media.

Figure 4:
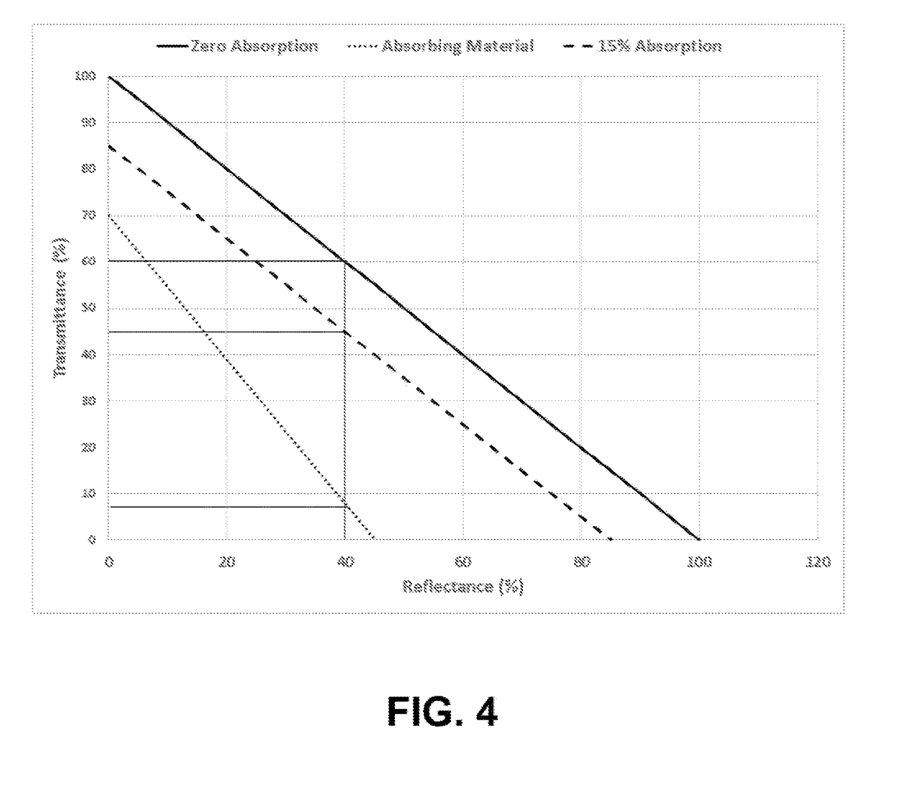
FIG. 4 illustrates the transmittance versus reflectance relationship for a single layer of silver on a substrate of an electro-optic device.

The option for a transflector on the second surface 22B, which has surface isolation from the environment, enables use of metals and materials that are not environmentally durable. In particular, silver based alloys may now be used in the transflector layer. The optical properties of silver and its alloys has another useful characteristic—lower absorption. FIG. 4 illustrates the reflectance and transmittance relationship of a silver coating for different thicknesses. As understood from FIG. 4, the absorption, which equals 100% minus the reflectance and transmittance, may be calculated. Further, as illustrated in FIG. 4, the absorption is approximately 13-15%. The use of a silver layer in a transflective coating will therefore enable a broader combination of attainable reflectance and transmittance attributes. While the relationship between the reflectance and transmittance of a silver film shows an absorption of about 14%, it is known that the optical properties of silver may be tuned by adjusting the deposition parameters to further reduce the absorption. Therefore, the range of attainable reflectance and transmittance values of a silver based transflector may be adjusted.

With reference again to FIG. 4, the theoretically attainable reflectance and transmittance of a system with zero absorption is generally illustrated. The area to the upper right of the zero absorption line is generally not attainable since the sum of reflectance, transmittance, and absorption has to equal 100%. The area to the lower left of the zero absorption line is attainable through the use of absorbing materials as part of the electro-optic assembly 10 or the transflective coating 70. The reflectance and transmittance relationship of a silver based coating with an assumed 15% absorption is shown in FIG. 4, along with the reflectance and transmittance relationship of an absorbing metal. The zone between these two lines is the additional region enabled by the inclusion of a silver based layer to the transflector stack. FIG. 4 also shows the attainable transmittance of the different options for a 40% reflector. The range of allowable transmittance is approximately four times larger for the silver based transflector compared to the absorbing metal transflector.

Figure 5:
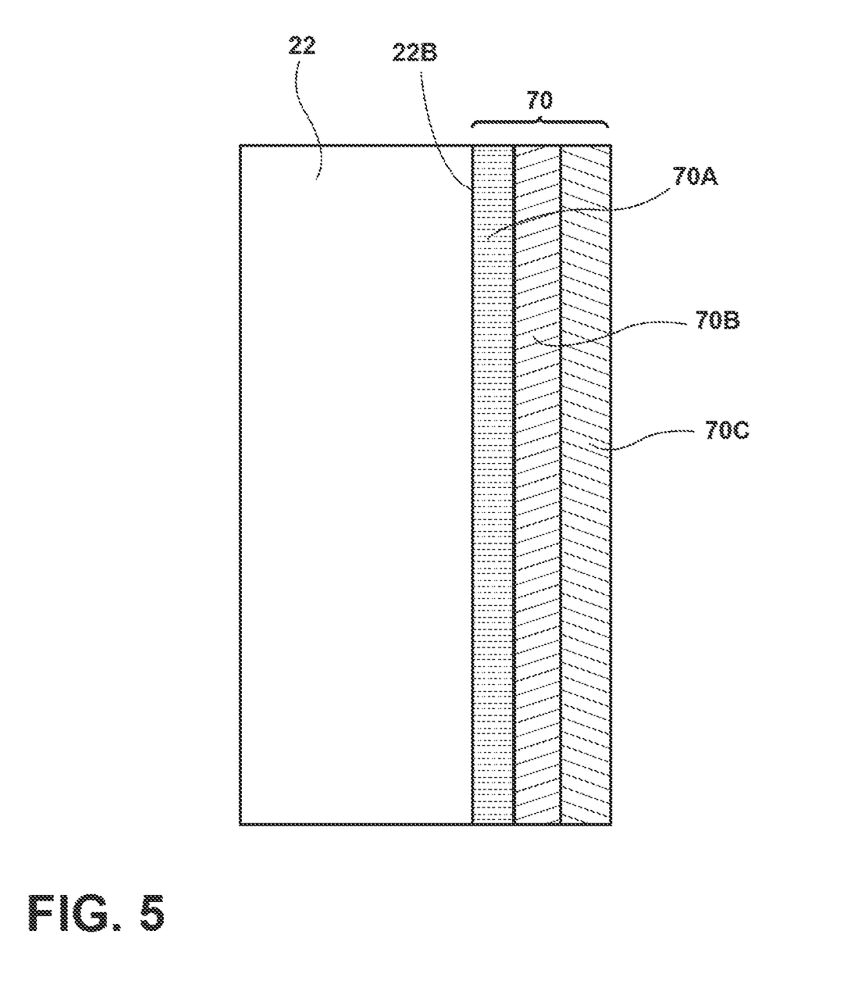
FIG. 5 is a side schematic cross-sectional view of a coating of the present disclosure.

The allowable combination of reflectance and transmittance for the electro-optic assembly 10 including a silver based transflector may be selected such that the reflectance plus transmittance (R+T)<90%. However, other silver based transflectors may have (R+T) values of less than 80% or even less than 70% or 60%. As illustrated in FIG. 5, the transflective coating 70 may be disposed on the second surface 22B of the substrate 22. The transflective coating 70 is sub-divided into three sub-layers. It should be understood that the novel silver based transflector is not limited to a three-layer stack. Fewer or additional sub-layers may be present and within the scope of this disclosure. The three-layer stack is presented to allow description of the optional functions of the additional layers. The reflectance of the transflective coating 70 is greater than about 20%, may be greater than about 30%, or may be greater than about 40%.

In one non-limiting example, a silver based conductive layer 70B has a thickness that may vary from about 2 nm to 30 nm, or alternatively between about 6 nm to 15 nm. The silver based layer 70B may also be subdivided or be comprised of alloys. Useful additions to the silver material may include, but are not limited to, gold, palladium, platinum, rhodium, titanium, aluminum, zinc, copper, tin, silicon, germanium, manganese, magnesium, tungsten, lead, boron, chrome, thorium, tantalum, lithium, and indium.

An optional base layer 70A may include at least one of a dielectric, TCO, or metal layer. The base layer 70A may be used to help adhesion or tune reflectance and/or transmittance. TCO materials may be selected from the list that includes ITO, F:SnO2, Sb:SnO2, Doped ZnO such as Al:ZnO, Ga:ZnO, B:ZnO, IZO, and Nb:TiO2. The dielectrics may be selected from the group described for the MDM structure. Similarly, the metals suitable for the base layer 70A may also be selected from the group detailed above. As the thickness of the silver layer is increased to increase the conductivity and lower the sheet resistance, the reflectance will be increased. The base layer 70A may be tuned to adjust the reflectance and transmittance intensity and/or color of the transflective coating 70.

An optional overcoat layer 70C may include a TCO or a platinum group metal, such as ruthenium, rhodium, platinum, palladium, osmium, or iridium. Both types of materials will be compatible with the electrochromic media, while providing at least one of increased conductivity (lower sheet resistance), reflectance tuning, transmittance tuning, or both, or higher color rendering index (CRI) values. The overcoat layer may be disposed between the electro-optic material and the silver conductive layer. In addition, the overcoat layer may include at least one of a TCO and a noble metal.

According to other examples, the transflective coating 70 may include any of the transflective coatings and layers disclosed in U.S. Provisional Patent Application No. 62/205, 376, filed on Aug. 14, 2015, entitled "ELECTRO-OPTIC ASSEMBLY," US Patent application Ser. No. 15/650,559, filed on Jul. 14, 2017, entitled "ELECTRO-OPTIC ELEMENT WITH IMI LAYER," and U.S. patent application Ser. No. 15/650,618, filed on Jul. 14, 2017, entitled "ELECTRO-OPTIC ELEMENT WITH HIGH DOUBLE IMAGE RATIO," the entire disclosures of which are incorporated herein by reference.

Since the primary reflectance of the heads up display system 14 comes from the transflective coating 70 located on either the first surface 22A or the second surface 22B of the electro-optic assembly 10, it is generally important to minimize secondary reflections from the other surfaces (e.g., the first through fourth surfaces 22A-26B where the transflective coating 70 is not present), which may result in a blurry image (i.e., double imaging). Accordingly, use of the anti-reflection coatings 80 may be advantageous. An example of the anti-reflection coating 80 may be a transparent conductive oxide. With respect to the examples described herein, the second and third surfaces 22B, 26A may include transparent electrodes. Transparent conductive oxides (TCO), such as ITO, F:SnO$_2$, doped-ZnO, IZO, or other layers, are commonly used in electro-optic devices, such as electrochromic systems. As noted above, the reflectance of these materials is a function of the thickness of the coatings due to interference effects. A minimum reflectance may be obtained by tailoring the thickness of the conductive oxide coating (e.g., the anti-reflection coating 80). The minimum reflectance is at a half wave optical thickness. Depending on the wavelengths of the projector 46 of the heads up display system 14, the wavelength for the half wave condition may be adjusted to get the net lowest reflectance value. For example, a reflectance of an ITO coating may be as low as, or lower than, 0.5% from the second and third surfaces 22B, 26A with a layer about 145 nm thick of the anti-reflection coating 80.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An electro-optic assembly, comprising:
a first partially reflective, partially transmissive substrate defining a first surface and a second surface;
a second partially reflective, partially transmissive substrate defining a third surface and a fourth surface;
a space defined between a first substrate and a second substrate;
an electro-optic material disposed between the second surface of the first substrate and the third surface of the second substrate, wherein said electro-optic assembly is operable to change a transmittance state in either a discrete or continuous manner; and
a transflective coating disposed on the second surface, the transflective coating including a silver conductive layer and an overcoat layer including one of a transparent conductive oxide and a noble metal, wherein the overcoat layer is disposed between the silver conductive layer and the electro-optic material.

2. The electro-optic assembly of claim 1, further comprising:
a base layer disposed between the first substrate and the silver conductive layer, wherein the base layer includes at least one of a transparent conductive oxide (TCO), a dielectric material, and a metal material.

3. The electro-optic assembly of claim 1, wherein a reflectance plus transmittance of the transflective coating is less than about 70%.

4. The electro-optic assembly of claim 1, wherein the thickness of the silver conductive layer is between about 6 nm to 15 nm.

5. The electro-optic assembly of claim 1, wherein the electro-optic material is an electrochromic material.

6. The electro-optic assembly of claim 1, wherein the electro-optic assembly is integrated into a heads up display system.

7. An electro-optic assembly, comprising:
a first partially reflective, partially transmissive substrate defining a first surface and a second surface;
a second partially reflective, partially transmissive substrate defining a third surface and a fourth surface;

a space defined between the first substrate and the second substrate;

an electro-optic material disposed between the second surface of the first substrate and the third surface of the second substrate, wherein said electro-optic assembly is operable to change a transmittance state in either a discrete or continuous manner; and a transflective coating disposed on the second surface, the transflective coating including a silver conductive layer and a base layer including at least one of a transparent conductive oxide (TCO), a dielectric material, and a noble metal, wherein the base layer is disposed between the silver conductive layer and the first substrate.

8. The electro-optic assembly of claim 7, further comprising:

an overcoat layer between the electro-optic material and the silver conductive layer, wherein the overcoat layer includes at least one of a TCO and a noble metal.

9. The electro-optic assembly of claim 7, wherein the transflective coating includes a first TCO layer, a silver layer, and a second TCO layer.

10. The electro-optic assembly of claim 9, wherein the first TCO layer and the second TCO layer include indium tin oxide.

11. The electro-optic assembly of claim 7, wherein a reflectance plus transmittance of the transflective coating is less than about 80%.

12. The electro-optic assembly of claim 7, wherein a thickness of the silver conductive layer is between about 2 nm to 30 nm.

13. The electro-optic assembly of claim 7, wherein a reflectance of the transflective coating is greater than about 20%.

14. The electro-optic assembly of claim 7, wherein the electro-optic material is an electrochromic material.

15. The electro-optic assembly of claim 7, wherein a sheet resistance value of the transflective coating is less than about 20 ohms/sq.

16. The electro-optic assembly of claim 7, wherein the electro-optic assembly is integrated into a heads up display system.

17. An electro-optic assembly, comprising:

a first substrate defining a first surface and a second surface;

a second substrate defining a third surface and a fourth surface;

a space defined between the first substrate and the second substrate;

an electro-optic material disposed between the second surface of the first substrate and the third surface of the second substrate; and a transflective coating disposed on at least one of the first surface and the second surface, the transflective coating including a dielectric layer adjacent to the first substrate and a conductive metallic layer, wherein a transmittance of the transflective coating is between about 15% and 50% and a reflectance of the transflective coating is between about 10% and 50%.

18. The electro-optic assembly of claim 17, further comprising:

an undercoat metallic layer between the first substrate and the dielectric layer.

19. The electro-optic assembly of claim 18, wherein the thickness of the metallic layer is between about 0.2 nm and 5 nm.

20. The electro-optic assembly of claim 17, wherein a reflectance of the transflective coating is between about 15% to 40% and the transmittance is between about 20% to 40%.

21. The electro-optic assembly of claim 17, wherein the thickness of the dielectric layer is between about 20 nm and 100 nm.

22. The electro-optic assembly of claim 17, wherein the electro-optic material is an electrochromic material.

23. The electro-optic assembly of claim 17, wherein the electro-optic assembly is integrated into a heads up display system.

* * * * *

UNITED STATES PATENT AND TRADEMARK OFFICE
CERTIFICATE OF CORRECTION

PATENT NO. : 10,234,720 B2
APPLICATION NO. : 15/650540
DATED : March 19, 2019
INVENTOR(S) : Mario F. Saenger Nayver et al.

It is certified that error appears in the above-identified patent and that said Letters Patent is hereby corrected as shown below:

Column 14, Claim 20, Line 28:
"a" should be --the--.

Signed and Sealed this
Ninth Day of July, 2019

Andrei Iancu
*Director of the United States Patent and Trademark Office*